Oct. 9, 1928. 1,686,925
J. REID
GEAR POWER
Filed Nov. 22, 1927   2 Sheets-Sheet 1

INVENTOR.
John Reid
BY
ATTORNEYS

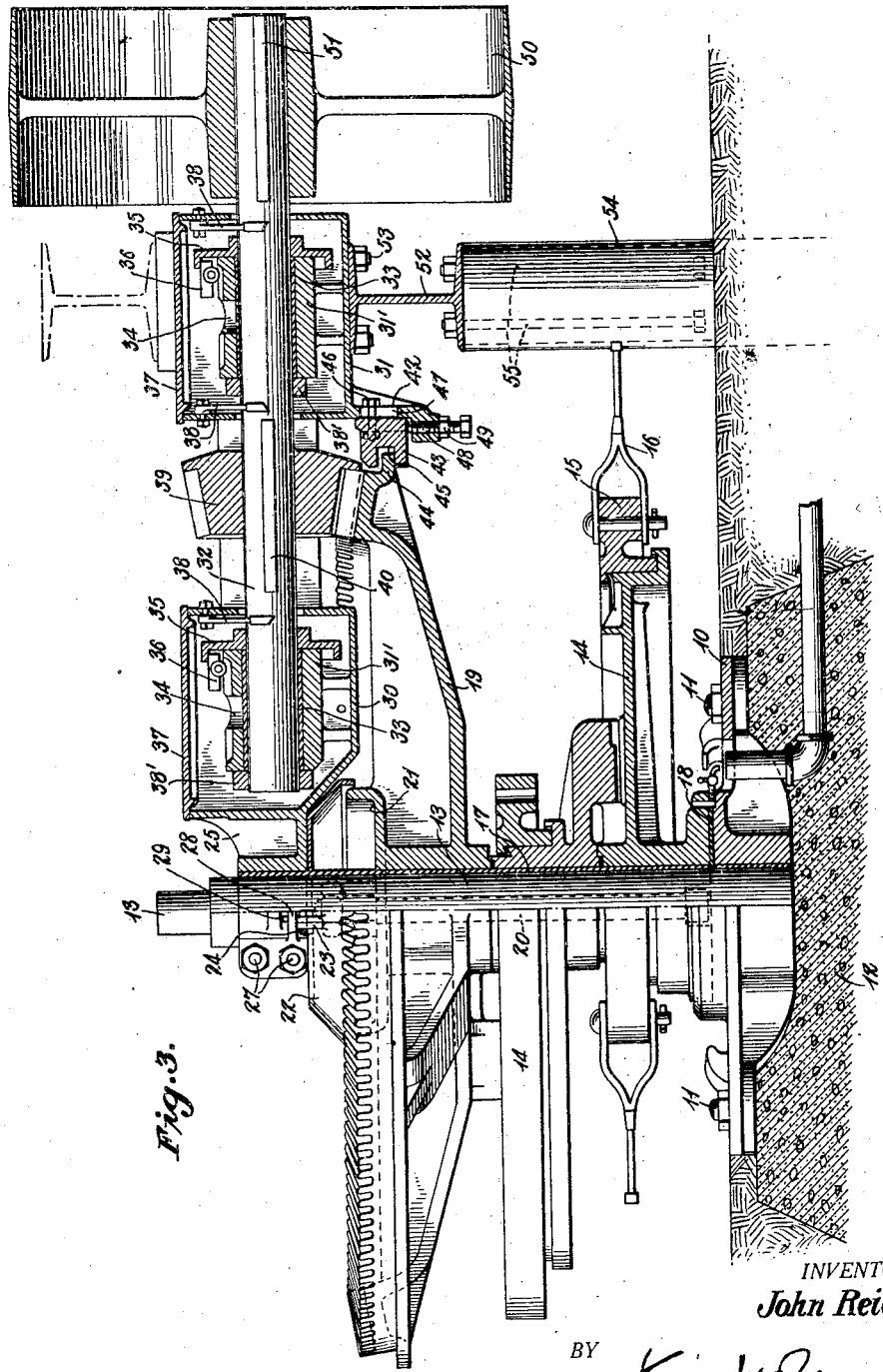

Patented Oct. 9, 1928.

1,686,925

UNITED STATES PATENT OFFICE.

JOHN REID, OF OIL CITY, PENNSYLVANIA, ASSIGNOR TO JOSEPH REID GAS ENGINE COMPANY, OF OIL CITY, PENNSYLVANIA.

GEAR POWER.

Application filed November 22, 1927. Serial No. 235,102.

This invention relates to gear powers and particularly to devices of this character which find special utility in oil fields and the like.

Devices of this character are employed mainly for developing, from a single source of power, reciprocating movements in a plurality of connections extending in different radial directions outwardly to, for instance, a corresponding number of pumps or other work. The power is derived directly from eccentrics connected to and rotated by the power, eccentric rings being carried by these eccentrics with the power transmitting rods connected thereto.

It is a particular object of this invention to provide a device of this character in which the construction of the driving and driven parts is modified so as to render the same simple, durable and efficient, means being also provided for affording efficient lubrication.

The novel combination, construction and arrangement of parts of my improved invention will be made more apparent as this description proceeds, especially when considered in connection with the accompanying drawings wherein:

Fig. 3 is an enlarged view partly in vertical section.

Figure 1:
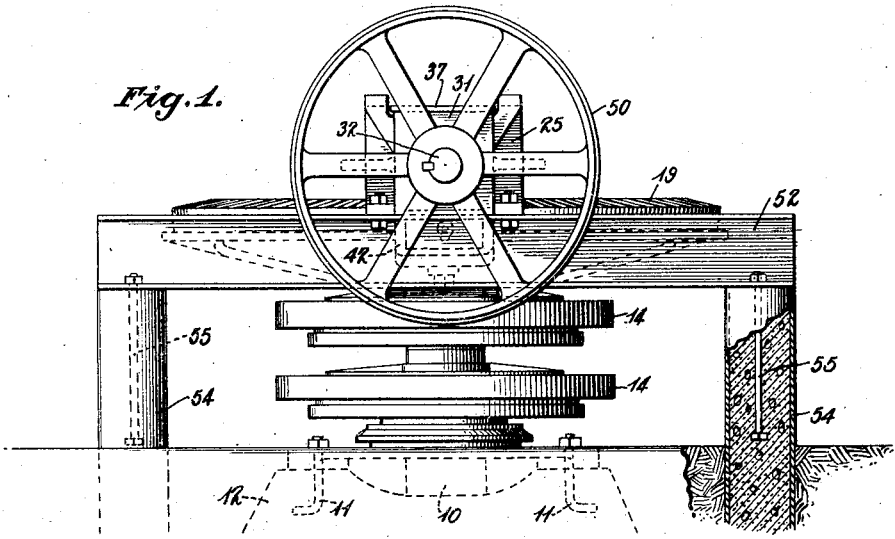
Figure 1 is an end elevation of a power constructed in accordance with this invention.
Figure 2:
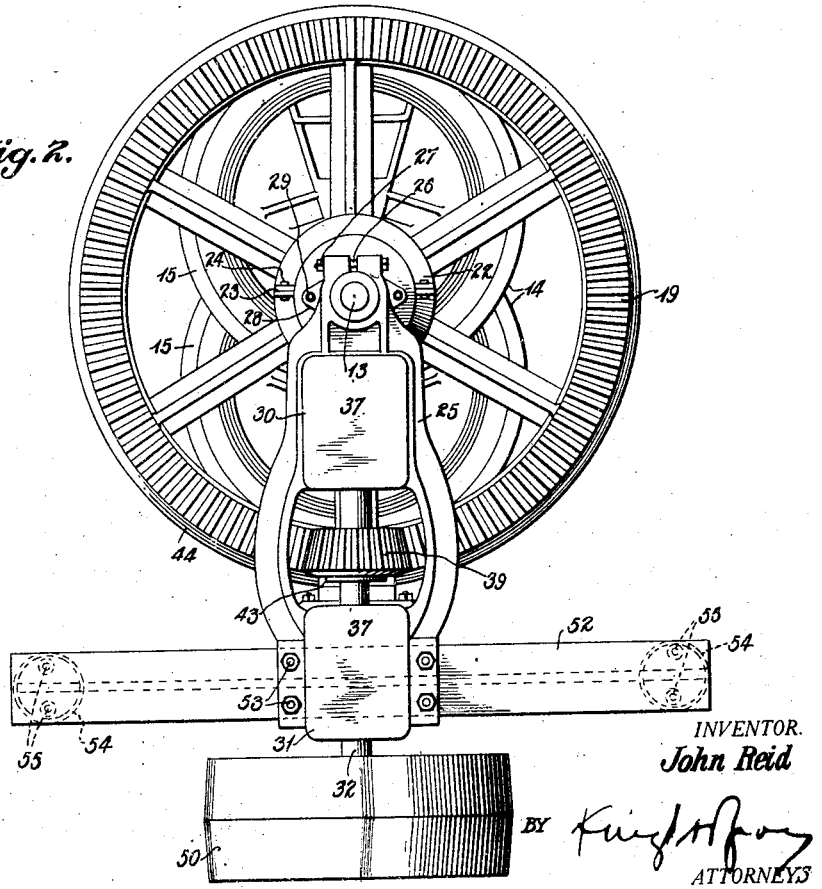
Fig. 2 is a plan view of the power.

Referring now particularly to the drawings wherein like reference characters indicate like parts it will be noted that the power consists of a base 10 suitably mounted and anchored by foundation bolts 11 to a foundation 12 of cement or other similar material. Extending upwardly from this base is a shaft 13 upon which the eccentrics 14 are rotatably mounted, eccentric rings 15 being carried by these eccentrics, with which connection is made to the power transmitting rods by means of connecting members 16. Arranged between the hubs of the eccentrics and of the gear yet to be described and the shaft 13 is a bronze bushing 17 while a bronze bearing plate 18 is preferably disposed between the lower face of the bottom eccentric and the base plate 10.

Mounted upon the shaft 13 is a gear 19, preferably a bevel gear, this gear being tied to the eccentrics by means of a pair of vertically extending bolts 20 so that the gear 19 and the eccentrics rotate together. The hub of the gear 19 is preferably formed with a shallow pan-like portion 21 adjacent its upper end into which lubricant may be conveyed so that the bearing surface of the rotating parts may be constantly and properly oiled. A dust cap or cover 22, preferably divided along the line 23, may be connected together and arranged in position to cover the lubricant receptacle 21 and maintained in this position by clamping bolts 24. Thus dust and other foreign matter will be excluded from the lubricant receptacle.

Extending horizontally from the shaft 13 is a frame indicated generally by the reference character 25. The end of this frame is bored for the reception of the upper end of the shaft 13 and split as at 26 and suitably apertured for the reception of a clamping bolt 27 by means of which it may be tightly secured around the end of the shaft 13. Apertured ears 28 formed on the frame 25 are engaged by bolts 29 which pass into the dust cap 22 for properly positioning the dust cap with reference to the lubricant receiving receptacle 21.

The frame 25 is formed with housings 30 and 31 within which there are arranged bearings 31' for a shaft 32. Associated with each of these bearings is a bronze bushing 33, each bearing being formed with an aperture 34 adjacent its upper side. Fixed on the shaft and within each of the housings 30 and 31 is an oil ring 35, these oil rings being adapted to rotate with the shaft 32 and to dip into lubricant contained within the housings 30 and 31. These rings are engaged by wipers 36 whereupon the lubricant is removed therefrom and permitted to flow downwardly through the apertures 34 for thoroughly lubricating the bearings of the shaft 32. The upper side of each of the housings 30 and 31 is open and may be closed by a cover 37. At each point where the housings 30 and 31 are apertured for the passageway of the shaft 32 therethrough there is provided an additional wiper 38 for preventing the escape of any oil therefrom. Collars 38' are fixed to the shaft 32 for taking the thrust of said shaft. The shaft 32 has mounted thereon a bevel pinion 39 fixed to rotate with the shaft 32 by means of a key 40. This bevel pinion 39 is arranged to mesh with the bevel gear 19. The casing 31 is provided with a downwardly extending flange 42 which may be formed integrally therewith or which may be cast separately and bolted thereto. Associated with the flange 42 is a slotted member 43 constituting a guide for the bevel gear 19, the gear 19 being for this purpose provided with a peripheral circumferential flange 44 which is adapted to extend freely into the slot 45 of the member 43. The member 43 is adjustably connected to the flange 42 by means of a bolt 46, which bolt passes through a slot 47 formed in the flange 42. A threaded setting pin 48 passes upwardly through the lower edge of the flange 42 and engages the member 43 whereby upon rotation of the setting pin 48 the member 43 may be adjusted. A lock nut 49 secures the setting pin 48 in any of its adjusted positions.

Arranged on the end of the shaft 32 is a pulley wheel 50 which is preferably keyed thereto by the key 51. Thus the power connection between the engine and the shaft 32 may consist of a belt.

For supporting the end of the shaft remote from the power I provide preferably an I-beam 52 to which the frame 25 is secured by means of bolts 53. The ends of this I-beam may be extended to any suitable distance, depending upon the immediate typography of the area in which the device is set up. The ends of the I-beam 52 will preferably be supported upon rigid fixed supports formed preferably by sinking casings 54 into the ground and filling the same with cement in which bolts 55 are embodied. The I-beams may be placed upon the upper ends of these supports and be bolted thereto by means of the exposed ends of the bolts 55.

The character of the frame 25 is such that when the typography or the arrangement of the power necessitates, the I-beam 52 may be bolted to the top of the frame 25 as indicated in dotted lines in Fig. 3. For instance, if only one eccentric is mounted on the shaft 13 and it is found that the I-beam 52 interferes with the freedom of movement of the power transmitting rods the I-beam may be arranged on top of the frame 25, and the frame suspended therefrom instead of resting on this I-beam as shown in full lines in the figures.

It will be noted that the frame 25 not only constitutes a rigid supporting means for the upper end of the shaft 13 but provides means for mounting alined bearings for the shaft 32. Owing to the imperfections which may exist in the gear 19 and to the wear which may be occasioned thereto the presence of the member 43 for guiding this gear insures an even rotation of the gear and a constant meshing of this gear with the pinion 39. Obviously, should it be desired to drive the eccentrics by means of a band-wheel the gear 19 as well as the frame 25 may be removed and a band wheel or other type of driving means arranged on the shaft 13 and connected to the eccentrics. Thus the structure herein described offers the possibility of removing as a unit the drive means for the eccentrics.

The construction of the bearings for the shaft 32 is such that they may be easily repaired when desired and may be easily supplied with lubricant, merely by removing the cover 37 therefrom.

While one embodiment of the invention has been described and illustrated herein in some detail it will be immediately apparent to those skilled in this art that various modifications of this structure may be resorted to without departing from the spirit and scope of this invention and to this end reservation is made to make such changes as may come within the perview of the accompanying claims.

Having thus described my invention, what I claim is:

1. In a power device of the character described, a shaft, eccentrics mounted on said shaft, a gear mounted on said shaft and fixed to said eccentrics for rotation therewith, a frame releasably connected to said shaft for supporting said shaft, a drive shaft mounted on said frame, a gear on said drive shaft meshing with said first-mentioned gear, and independent means for supporting the outer end of said frame.

2. In a power device of the character described, a shaft, eccentrics mounted on said shaft, a gear mounted on said shaft and fixed to said eccentrics for rotation therewith, a frame releasably clamped to said shaft for supporting said shaft, said frame being angularly and axially adjustable with respect to said shaft, a drive shaft mounted on said frame, a gear on said drive shaft meshing with said first-mentioned gear, and independent means for supporting the outer end of said frame.

The foregoing specification signed at Oil City, Pennsylvania this 19th day of November, 1927.

JOHN REID.